United States Patent
Aila et al.

(10) Patent No.: US 9,171,394 B2
(45) Date of Patent: Oct. 27, 2015

(54) LIGHT TRANSPORT CONSISTENT SCENE SIMPLIFICATION WITHIN GRAPHICS DISPLAY SYSTEM

(75) Inventors: Timo Oskari Aila, Tuusula (FI); Jaakko Tapani Lehtinen, Helsinki (FI); Samuli Matias Laine, Vantaa (FI)

(73) Assignee: NVIDIA CORPORATION, Santa Clara, CA (US)

( * ) Notice: Subject to any disclaimer, the term of this patent is extended or adjusted under 35 U.S.C. 154(b) by 283 days.

(21) Appl. No.: 13/553,483

(22) Filed: Jul. 19, 2012

(65) Prior Publication Data
US 2014/0022251 A1 Jan. 23, 2014

(51) Int. Cl.
G06T 15/50 (2011.01)
G06T 15/60 (2006.01)
G06T 15/06 (2011.01)

(52) U.S. Cl.
CPC ............. *G06T 15/06* (2013.01); *G06T 15/506* (2013.01)

(58) Field of Classification Search
CPC .............................. G06T 15/06; G06T 15/506
See application file for complete search history.

(56) References Cited

U.S. PATENT DOCUMENTS

| | | |
|---|---|---|
| 4,897,806 A | 1/1990 | Cook et al. |
| 5,113,493 A | 5/1992 | Crosby |
| 5,222,203 A | 6/1993 | Obata |
| 5,239,624 A | 8/1993 | Cook et al. |
| 5,289,565 A | 2/1994 | Smith et al. |
| 5,299,298 A | 3/1994 | Elmquist et al. |
| 5,357,579 A | 10/1994 | Buchner et al. |
| 5,384,667 A | 1/1995 | Beckwith |
| 5,402,534 A | 3/1995 | Yeomans |
| 5,465,119 A | 11/1995 | Demos |
| 5,684,935 A | 11/1997 | Demesa, III et al. |
| 5,729,672 A | 3/1998 | Ashton |

(Continued)

FOREIGN PATENT DOCUMENTS

| | | |
|---|---|---|
| CN | 1856805 | 11/2006 |
| CN | 101599181 | 12/2009 |
| WO | WO2012115711 | 8/2012 |

OTHER PUBLICATIONS

Gernot Schaufler and Henrik Wann Jensen, "Ray Tracing Point Sampled Geometry", In Proceedings of the Eurographics Workshop on Rendering Techniques 2000, p. 319-328, London, UK, 2000. Springer-Verlag.*

(Continued)

*Primary Examiner* — Sing-Wai Wu

(57) ABSTRACT

Method including casting a first plurality of rays towards an original 3-D scene comprising objects with object surfaces. Method also includes constructing a simplified representation of the original 3-D scene and adjusting the simplified representation to be consistent with the original 3-D scene. Simplified representation is adjusted by using known rays and object surface intersections obtained from the casting, to produce an adjusted simplified representation. Method further includes steps for rendering a high quality image: casting a second plurality of rays toward the adjusted simplified representation and testing the second plurality of rays for points of intersection with the object surfaces within the adjusted simplified representation, estimating incoming light within the adjusted simplified representation at the points of intersection with the object surfaces, examining material properties of the object surfaces, and calculating a color and light intensity for a plurality of pixels associated with the second plurality of rays.

14 Claims, 7 Drawing Sheets

(56) References Cited

U.S. PATENT DOCUMENTS

| | | | |
|---|---|---|---|
| 5,737,027 A | 4/1998 | Demos |
| 5,809,219 A | 9/1998 | Pearce et al. |
| 5,870,096 A | 2/1999 | Anjyo et al. |
| 5,973,700 A | 10/1999 | Taylor et al. |
| 5,982,385 A | 11/1999 | Fish et al. |
| 6,034,667 A | 3/2000 | Barrett |
| 6,211,882 B1 | 4/2001 | Pearce et al. |
| 6,300,956 B1 | 10/2001 | Apodaca et al. |
| 6,618,048 B1 | 9/2003 | Leather |
| 6,636,214 B1 | 10/2003 | Leather et al. |
| 6,700,586 B1 | 3/2004 | Demers |
| 6,707,458 B1 | 3/2004 | Leather et al. |
| 6,717,577 B1 | 4/2004 | Cheng et al. |
| 6,720,975 B1 | 4/2004 | Dietrich, Jr. |
| 6,811,489 B1 | 11/2004 | Shimizu et al. |
| 6,867,781 B1 | 3/2005 | Van Hook et al. |
| 6,885,384 B2 | 4/2005 | Deering et al. |
| 6,999,100 B1 | 2/2006 | Leather et al. |
| 7,002,591 B1 | 2/2006 | Leather et al. |
| 7,034,828 B1 | 4/2006 | Drebin et al. |
| 7,050,066 B2 | 5/2006 | Ohta |
| 7,061,502 B1 | 6/2006 | Law et al. |
| 7,075,545 B2 | 7/2006 | Van Hook et al. |
| 7,119,813 B1 | 10/2006 | Hollis et al. |
| 7,133,041 B2 | 11/2006 | Kaufman et al. |
| 7,133,047 B2 | 11/2006 | Pallister |
| 7,136,081 B2 | 11/2006 | Gritz et al. |
| 7,176,919 B2 | 2/2007 | Drebin et al. |
| 7,184,059 B1 | 2/2007 | Fouladi et al. |
| 7,187,379 B2 | 3/2007 | Keller |
| 7,196,710 B1 | 3/2007 | Fouladi et al. |
| 7,205,999 B2 | 4/2007 | Leather |
| 7,230,618 B2 | 6/2007 | Keller |
| 7,307,638 B2 | 12/2007 | Leather et al. |
| 7,307,640 B2 | 12/2007 | Demers et al. |
| 7,317,459 B2 | 1/2008 | Fouladi et al. |
| 7,362,332 B2 | 4/2008 | Gritz |
| 7,446,780 B1 | 11/2008 | Everitt et al. |
| 7,453,460 B2 | 11/2008 | Keller |
| 7,453,461 B2 | 11/2008 | Keller |
| 7,477,261 B2 | 1/2009 | Pallister |
| 7,483,010 B2 | 1/2009 | Bai et al. |
| 7,499,054 B2 | 3/2009 | Keller |
| 7,538,772 B1 | 5/2009 | Fouladi et al. |
| 7,576,748 B2 | 8/2009 | Van Hook et al. |
| 7,616,200 B1 | 11/2009 | Heinrich et al. |
| 7,623,726 B1 | 11/2009 | Georgiev |
| 7,697,010 B2 | 4/2010 | Pallister |
| 7,701,461 B2 | 4/2010 | Fouladi et al. |
| 7,742,060 B2 | 6/2010 | Maillot |
| 7,961,970 B1 | 6/2011 | Georgiev |
| 7,973,789 B2 | 7/2011 | Cook |
| 7,995,069 B2 | 8/2011 | Van Hook et al. |
| 8,098,255 B2 | 1/2012 | Fouladi et al. |
| 8,970,584 B1 | 3/2015 | Aila et al. |
| 2003/0083850 A1 | 5/2003 | Schmidt et al. |
| 2003/0234789 A1 | 12/2003 | Gritz |
| 2006/0101242 A1 | 5/2006 | Siu et al. |
| 2007/0046686 A1 | 3/2007 | Keller |
| 2008/0001961 A1 | 1/2008 | Roimela et al. |
| 2008/0244241 A1 | 10/2008 | Barraclough et al. |
| 2009/0167763 A1 | 7/2009 | Waechter et al. |
| 2011/0090337 A1 | 4/2011 | Klomp et al. |
| 2012/0218264 A1 | 8/2012 | Clarberg et al. |
| 2012/0293515 A1 | 11/2012 | Clarberg et al. |
| 2012/0327071 A1 | 12/2012 | Laine et al. |
| 2013/0321420 A1 | 12/2013 | Laine et al. |

OTHER PUBLICATIONS

Lars Linsen, Karsten Muller and Paul Rosenthal, "Splat-based Ray Tracing of Point Clouds", Journal of WSCG 15: 51-58, 2007.*

Morgan McGuire and David Luebke, "Hardware-Accelerated Global Illumination by Image Space Photon Mapping", HPG 2009, New Orleans, Louisiana, Aug. 1-3, 2009.*

Moller., et al., "Stochastic Rasterization Using Time-Continuous Triangles," ACM, Jan. 2007, pp. 1-11.

Hou, Q., et al, "Micropolygon Ray Tracing with Defocus and Motion Blur," ACM Transactions on Graphics (TOG), vol. 29, Article 64, Jul. 2010, pp. 1-10.

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

Tomas Akenine-Moller, Jacob Munkberg, and Jon Hasselgren, "Stochastic rasterization using time-continuous triangles," Proc. Graphics Hardware 2009.

P. Haberli and K. Akeley, "The Accumulation Buffer: Hardware Support for High Quality Rendering," In Proc. SIGGRAPH 1990. pp. 309-318.

Wang Liqing, "Research on Algorithms of Computational Geometry in GIS," China Maters Thesis Full-Text Database 2009. pp. 7-13.

Sharat Chandran, Parag Chaudhuri, Sriram Kashyap, Rhushabh Goradia, GPU-Based Ray Tracing of Splats, Conference Paper, Sep. 2010, 101-108, IEE, Hangzhou.

Lars Linsen, Karsten Muller, Paul Rosenthal, Splat-Based Ray Tracing of Point Clouds, Article, 2007, 49-58, vol. 15 Issue 1-3, Vaclav Skala-UNION Agency, Czech Republic.

* cited by examiner

LIGHT TRANSPORT CONSISTENT SCENE SIMPLIFICATION WITHIN GRAPHICS DISPLAY SYSTEM

CROSS-REFERENCE TO RELATED APPLICATION

This application is related to patent application, "SURFACE CLASSIFICATION FOR POINT-BASED RENDERING WITHIN GRAPHICS DISPLAY SYSTEM," concurrently filed with this application Ser. No. 13/553,525, which is herein incorporated by reference in its entirety.

BACKGROUND OF THE INVENTION

Light transport algorithms based on ray tracing are used to sample a three dimensional scene and its illumination by casting rays within the scene. Typically, a large number of rays are required for high quality rendering, i.e. with an acceptable noise level. Because of this complexity, it is often beneficial to perform parts of lighting computations using a simplified representation of the three dimensional scene. Typical simplified representations are created using a standard k-nearest neighbor search to adapt to the local density of ray endpoints and derive a radius for each one. However, while creating a simplified representation is fast and automatic, there is no guarantee that the obtained simplified representation faithfully represents the original three dimensional scene. Scene misrepresentations due to simplification can lead to unwanted artifacts in rendered images.

BRIEF SUMMARY OF THE INVENTION

Accordingly, a need exists for a computer graphics method to create a simplified scene representation that is consistent with and faithfully represents the original three dimensional scene.

Embodiments of the present invention are directed towards a computer graphics method. The computer controlled method includes casting a first plurality of rays towards an original three dimensional scene comprising objects with object surfaces. The first plurality of rays may be recast within the original three dimensional scene. The method also includes constructing a simplified representation of the original three dimensional scene and adjusting the simplified representation to be consistent with the first plurality of rays used in the initial sampling of the original three dimensional scene. The simplified representation is adjusted by using known rays and object surface intersections obtained from the casting, to produce an adjusted simplified representation. The method further includes processes for rendering a high quality image including: casting a second plurality of rays toward said adjusted simplified representation and testing the plurality of rays for points of intersection with the object surfaces within the simplified representation, estimating incoming light within the adjusted simplified representation the points of intersection with the object surfaces, examining material properties of the object surfaces, and calculating a color and light intensity for a plurality of pixels associated with the second plurality of rays.

BRIEF DESCRIPTION OF THE DRAWINGS

The embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

For expository purposes, the term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Figure 1:
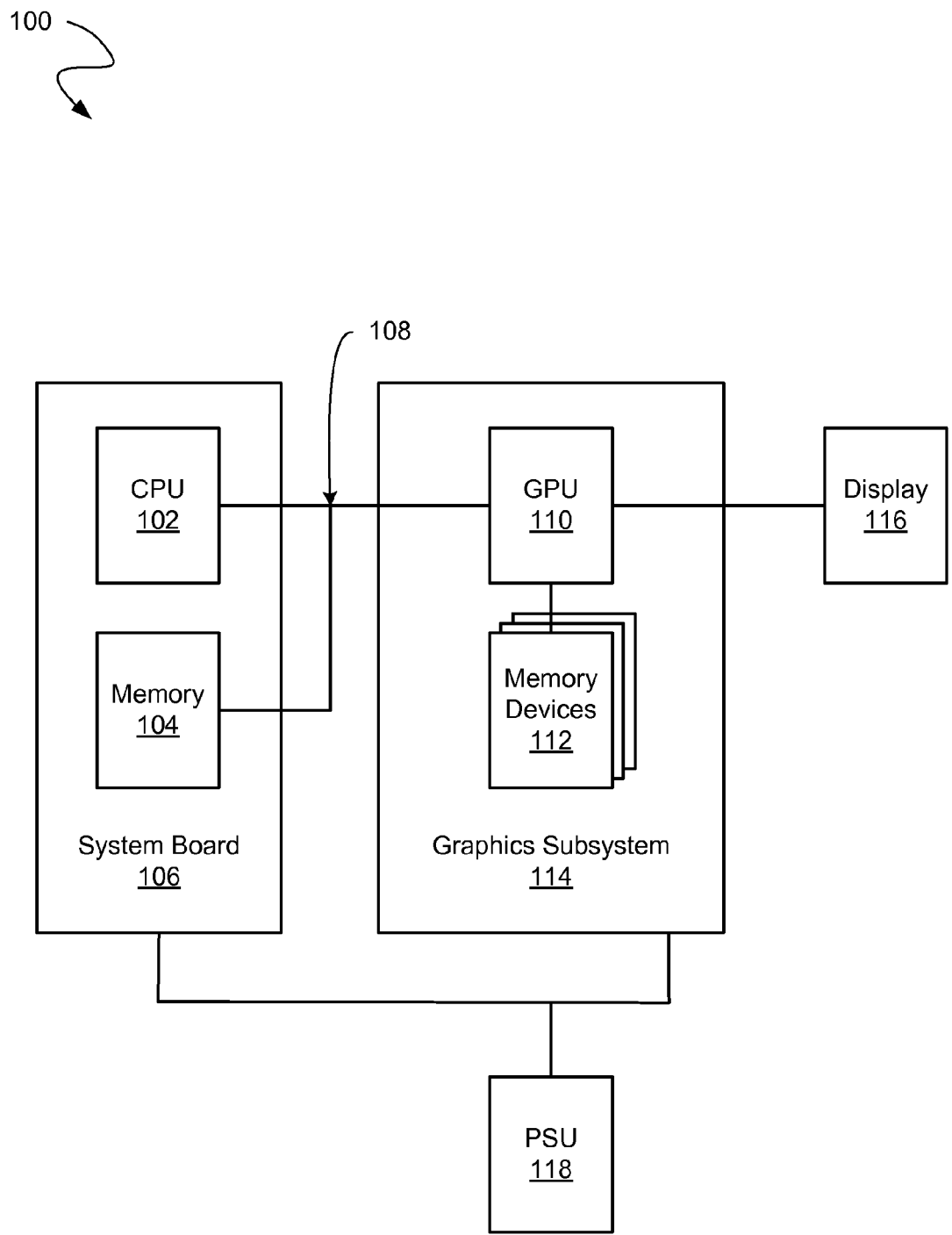
FIG. 1 shows an exemplary computer system, in accordance with one embodiment of the present invention.

FIG. 1 shows an exemplary computer system 100 in accordance with one embodiment of the present invention. Computer system 100 depicts the components in accordance with embodiments of the present invention providing the execution platform for certain hardware-based and software based functionality, in particular, computer graphics rendering and display capability. In general, computer system 100 comprises a system board 106 including at least one central processing unit (CPU) 102 and a system memory 104. The CPU 102 can be coupled to the system memory 104 via a bridge component/memory controller (not shown) or can be directly coupled to the system memory 104 via a memory controller (not shown) internal to the CPU 102.

Computer system 100 also comprises a graphics subsystem 114 including at least one graphics processor unit (GPU) 110. For example, the graphics subsystem 114 may be included on a graphics card. The graphics subsystem 114 may be coupled to a display 116. One or more additional GPU(s) 110 can optionally be coupled to computer system 100 to further increase its computational power. The GPU(s) 110 may be coupled to the CPU 102 and the system memory 104 via a communication bus 108. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, memory devices 112 may be coupled with the GPU 110 for high bandwidth graphics data storage, e.g., the frame buffer. In an embodiment, the memory devices 112 may be dynamic random-access memory. A power source unit (PSU) 118 may provide electrical power to the system board 106 and graphics subsystem 114.

The CPU 102 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 102. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 102 coupled to a dedicated graphics rendering GPU 110. In such an embodiment, components can be included that add peripheral buses, specialized audio/video components, IO devices, and the like. Similarly, system 100 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 102, 104, 110, 112, and the like) of a computing device are wholly contained within a single integrated circuit die. Examples include a hand-held instrument with a display, a car navigation system, a portable entertainment system, and the like.

Figure 2:
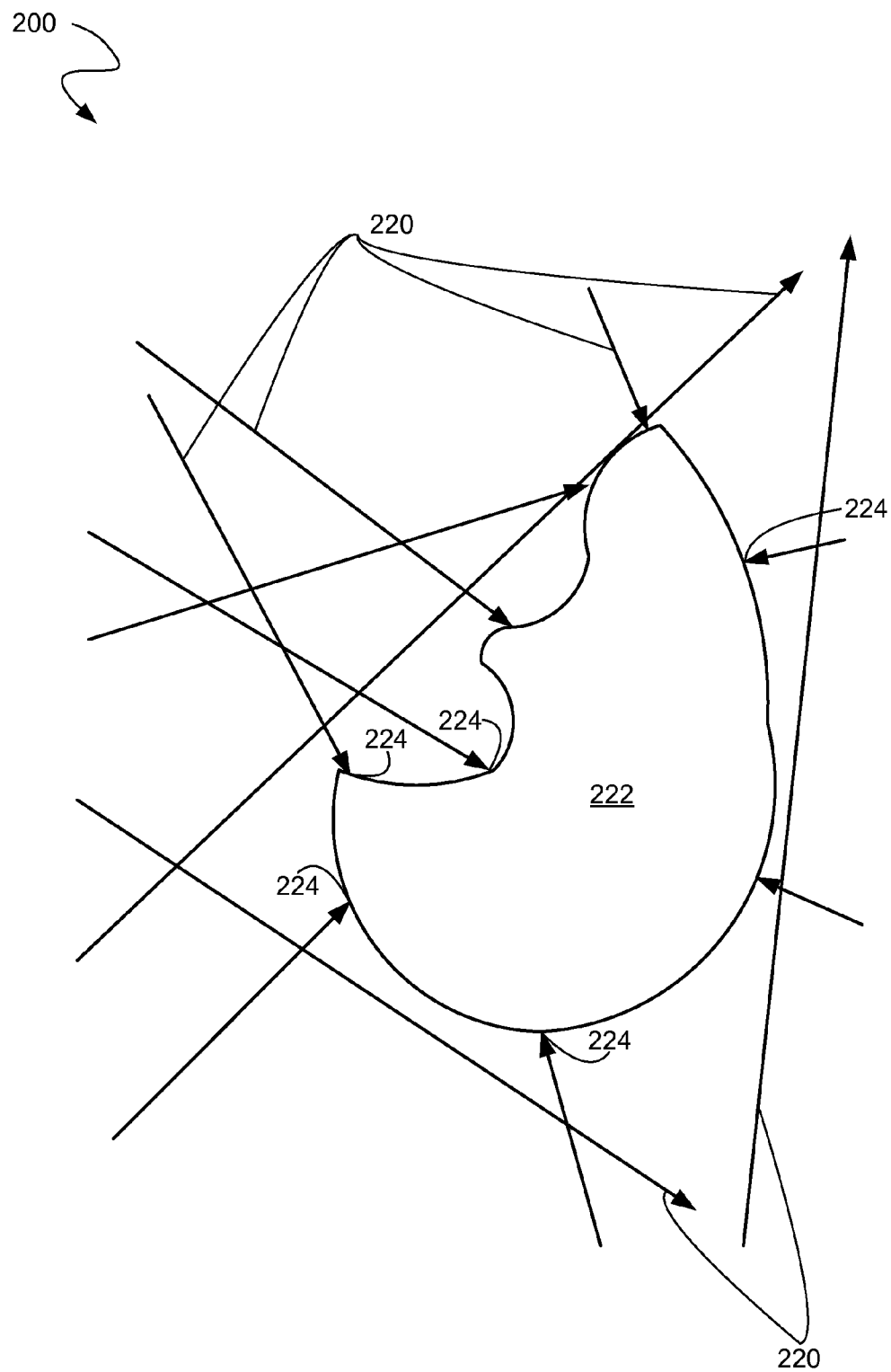
FIG. 2 depicts an original three dimensional scene and a plurality of rays cast using the original scene, in accordance with one embodiment of the present invention.

FIG. 2 depicts a diagram of an original three dimensional computer graphics scene 200 and a first plurality of rays 220 cast using the original scene 200, in accordance with one embodiment of the present invention. The scene may be represented in computer memory as graphics data stored therein. The original three dimensional scene 200 is a three dimensional model intended to be converted into a 2-D image by a computer graphics processing system for image display. The original three dimensional scene 200 comprises an object 222 within the scene. In an embodiment, the image is rendered using ray tracing, a technique for generating an image by tracing the path of light through pixels in an image plane and simulating the effects of its encounters with virtual objects.

In accordance with ray tracing graphics rendering, a first plurality of rays 220 are cast towards the object 222 within the original three dimensional scene 200. Once cast, the first plurality of rays 220 may intersect 224 with a surface of the object 222. The first plurality of rays 220 may also be recast a number of times within the scene 200 as reflected rays, transmitted rays, or shadow rays. The distribution of the origins and endpoints of the first plurality of rays 220 provide information about the locations and orientations of the scene 200 geometry.

When only a relatively small number of rays are cast into the original three dimensional scene 200, the resulting rendered image is typically of poor quality. Typically, a large number of rays are required for a high quality rendering, e.g. to bring noise down to a reasonable level. In an embodiment of the present invention, the first plurality of rays may reflect or refract off the object 222, resulting in additional rays within the original three dimensional scene 200. In another embodiment, more rays may need to be re-cast into the original three dimensional scene 200.

After the first plurality of rays 220 are cast towards the object 222, a simplified representation of the original three dimensional scene 200 is constructed.

Figure 3:
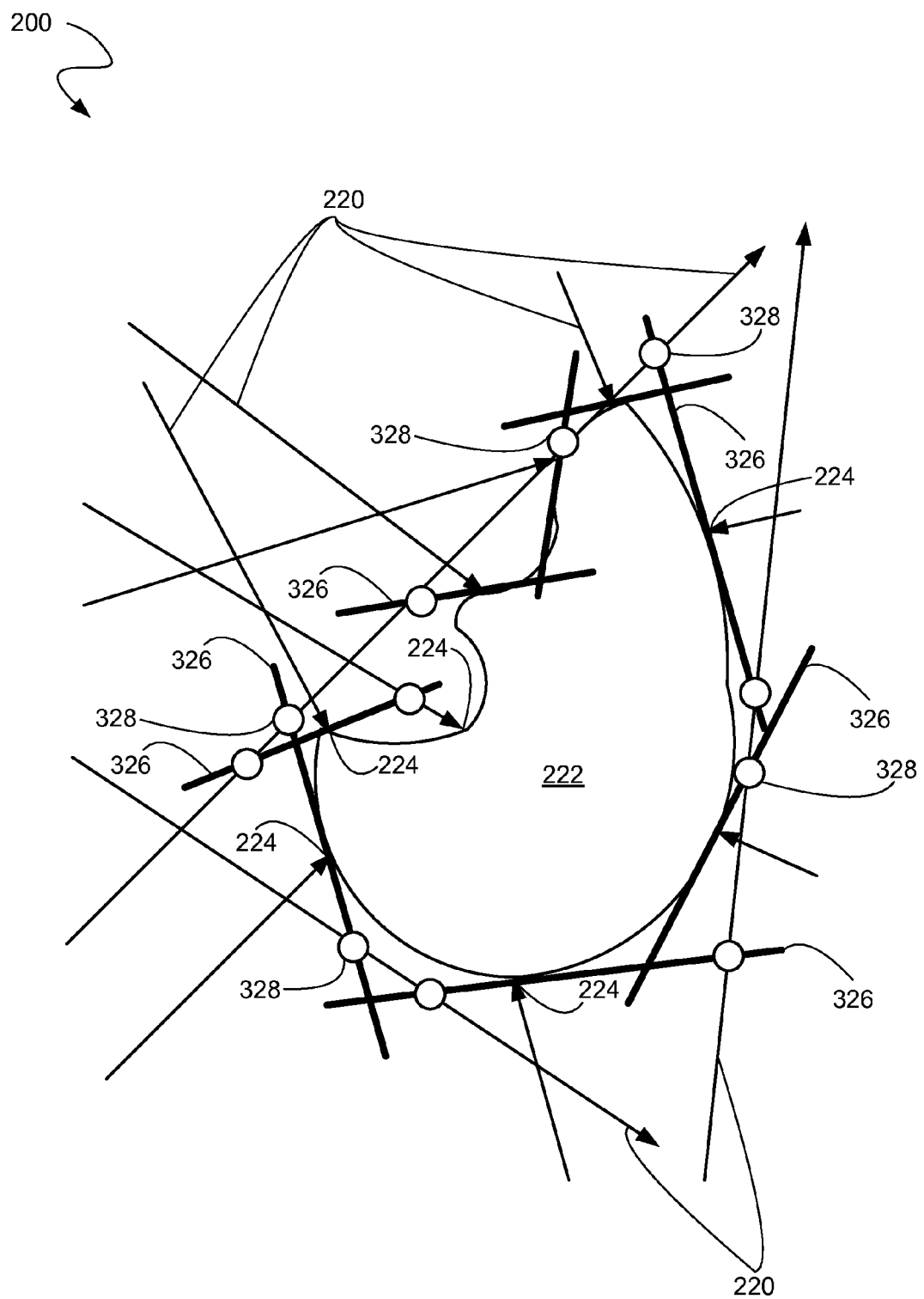
FIG. 3 depicts a simplified representation of the original three dimensional scene having splats placed at the plurality of rays' intersection points, in accordance with one embodiment of the present invention.

FIG. 3 depicts a simplified representation of the original three dimensional scene 200 having a plurality of splats 326 placed at the first plurality of rays' 220 intersection points 224, in accordance with one embodiment of the present invention. The splats 326 are located on the tangent planes of the ray endpoints, where the first plurality of rays 220 intersect 224 with the object 222. In an embodiment, splats 326 are circles on the tangent planes of the ray endpoints. In other embodiments, splats 326 may be elliptical, circular augmented with clipping lines, or other shapes.

The splats 326 may be formed by using a standard k-nearest neighbor search to adapt to the local density of the first plurality of rays' 220 intersection points 224 and derive a radius for each one in accordance with one embodiment. A k-nearest neighbor search is well known in the art. The result is an approximation of the original three dimensional scene 200 geometry in terms of splats 326 located on the tangent planes of the ray endpoints.

The splats 326 intersect with the first plurality of rays 220 at splat-ray intersection points 328. Because the splats 326 intersect with the plurality of rays 220, the splats do not approximate the original three dimensional scene 200 faithfully.

While this approach of placing splats 326 is typically fast and automatic, there is no guarantee that the obtained simplified representation of the original three dimensional scene faithfully represents the original three dimensional scene. Thus, the simplified representation may not be suitable for high-quality rendering.

Figure 4:
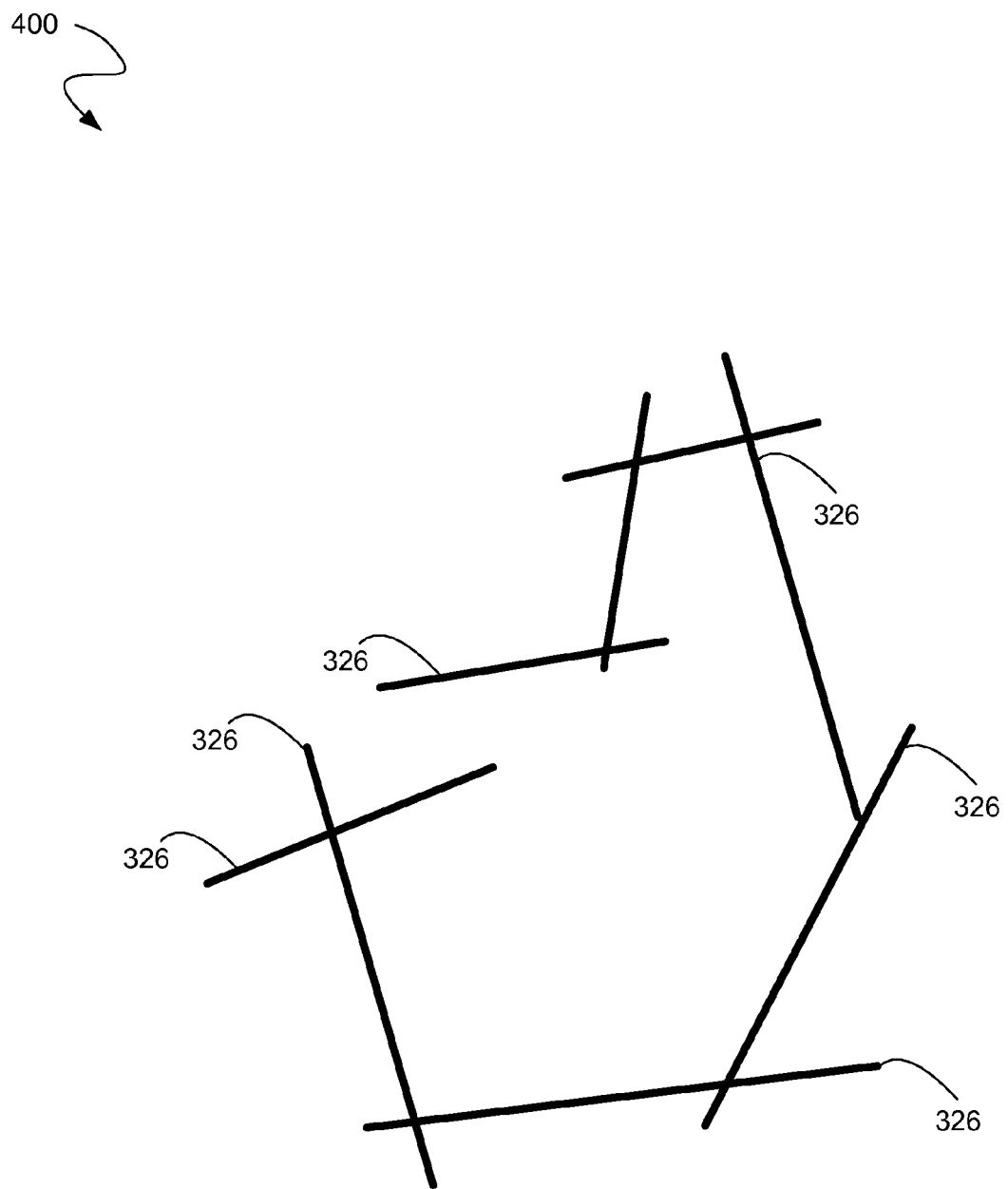
FIG. 4 depicts a simplified representation of the original three dimensional scene based on an approximation using splats, in accordance with one embodiment of the present invention.

FIG. 4 depicts a simplified representation 400 of the original three dimensional scene (FIG. 2) based on an approximation using splats 326, in accordance with another embodiment of the present invention. FIG. 4 is similar to FIG. 3 with the exception that it only shows the splats 326 that were placed on the tangent planes of the ray endpoints. As can be seen in FIG. 4, the splats do not approximate the original three dimensional scene 200 faithfully. It is possible that some rays 220 that are not occluded in the original three dimensional scene 200 will intersect the object 222 (FIG. 2) in the simplified representation 400. Embodiments of the present invention adjust the simplified representation 400 to approximate the original three dimensional scene 200 faithfully, as described below.

It can be appreciated that the simplified representation 400 may be represented using a polygon mesh or a triangular mesh.

Figure 5:
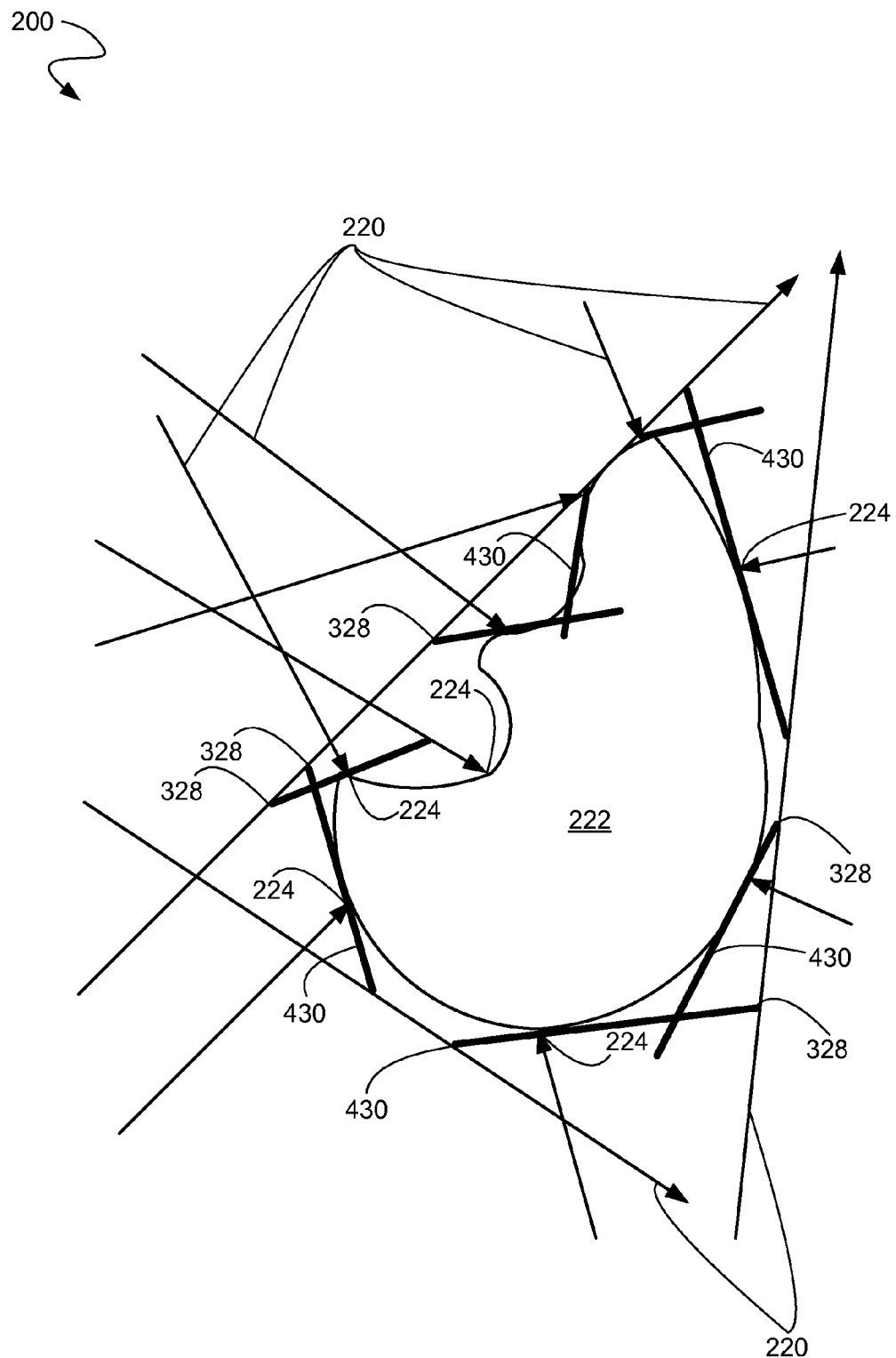
FIG. 5 depicts an adjusted simplified representation of the original three dimensional scene wherein the splats are shrunk to eliminate spurious intersections, in accordance with one embodiment of the present invention.

FIG. 5 depicts an adjusted simplified representation of the original three dimensional scene 200 wherein the splats 430 are shrunk to eliminate spurious intersections 328 (FIG. 3), in accordance with another embodiment of the present invention. As previously mentioned, because the splats 326 intersect with the first plurality of rays 220, the splats do not approximate the original three dimensional scene 200 faithfully.

The simplified representation 400 (FIG. 4) is adjusted to be consistent with the original input sampling obtained from casting the first plurality of rays 220. The adjusted simplified representation is consistent if casting the first plurality of rays 220 towards the simplified representation 400 (FIG. 4) and casting the first plurality of rays 220 towards the original three dimensional scene 200 yield the same points of intersection with surfaces of the object 222.

The adjusted simplified representation is constructed by tracing the rays that were used to obtain the input samples against the simplified representation 400 (FIG. 4) and by shrinking the splats 326 (FIG. 3) up to the splat-ray intersection points 328. The splats 326 (FIG. 3) may be shrunk by modifying each splat's 326 (FIG. 3) radius to be smaller than a distance between the spurious intersection and the origin of the splat 326 (FIG. 3). Shrinking the splats 326 (FIG. 3) yields adjusted splats 430. Since, from the initial sampling, knowledge exists that the first plurality of rays 220 were unobstructed until at least the splat-ray intersection points 328, the simplified representation 400 (FIG. 4) can be fine-tuned, resulting in an adjusted simplified representation that faithfully represents the original three dimensional scene 200.

Figure 6:
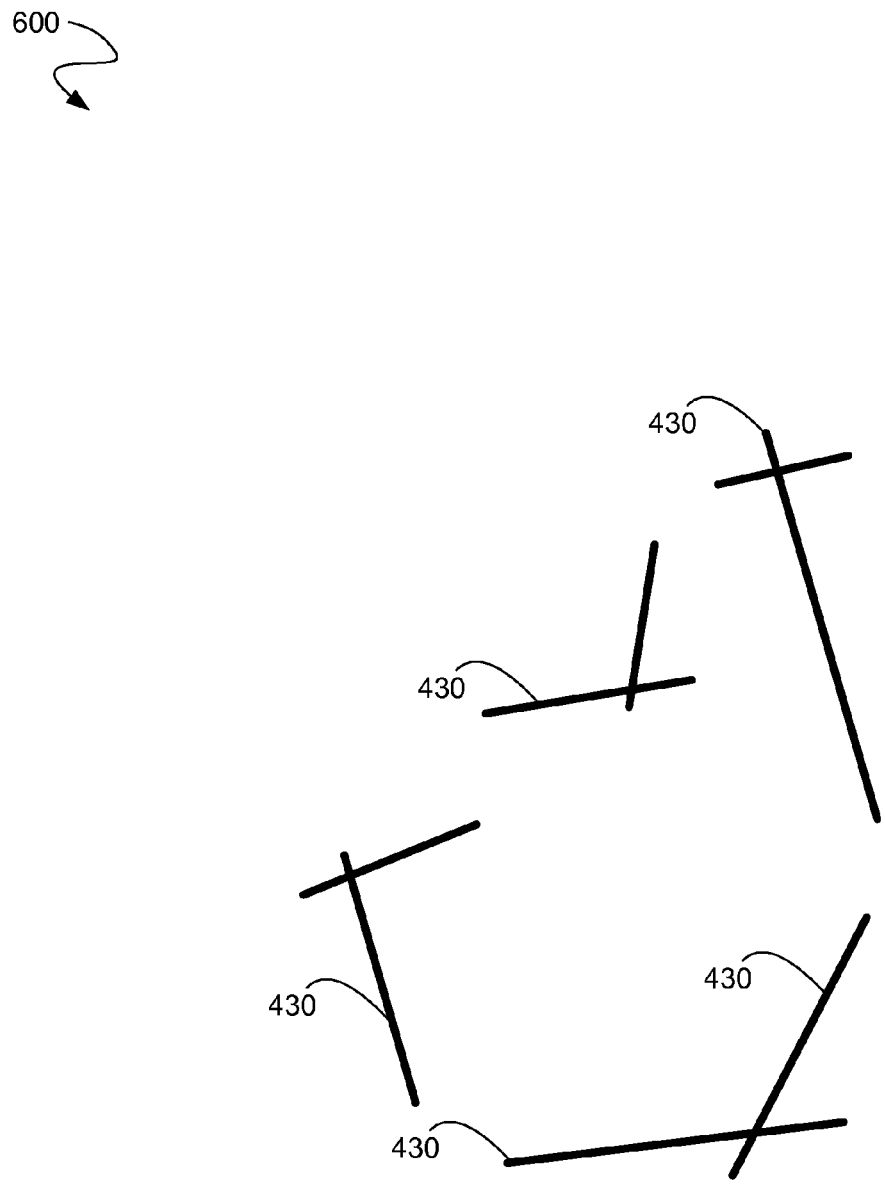
FIG. 6 depicts an adjusted simplified representation of the original three dimensional scene based on an approximation using shrunken splats, in accordance with one embodiment of the present invention.

FIG. 6 depicts an adjusted simplified representation 600 of the original three dimensional scene 200 (FIG. 2) based on an approximation using shrunken splats 430, in accordance with another embodiment of the present invention. FIG. 6 is similar to FIG. 5 with the exception that it only shows the shrunken splats 430 that were shrunk from the originally placed splats 326 (FIG. 3) on the tangent planes of the ray endpoints. As can be seen in FIG. 6, the splats approximate the original three dimensional scene 200 faithfully as there are no longer any spurious intersections 328 (FIG. 3).

Shrinking of the splats results in substantial improvement to the quality of the approximation and makes it suitable for high-quality rendering. All of the original rays hit the adjusted simplified model 600 in the same place as in the original three dimensional scene 200 representation (see FIG. 5 description). Performing a rendering operation on the adjusted simplified representation 600 yields a substantially similar result to performing a rendering operation on the original three dimensional scene 200.

Figure 7:
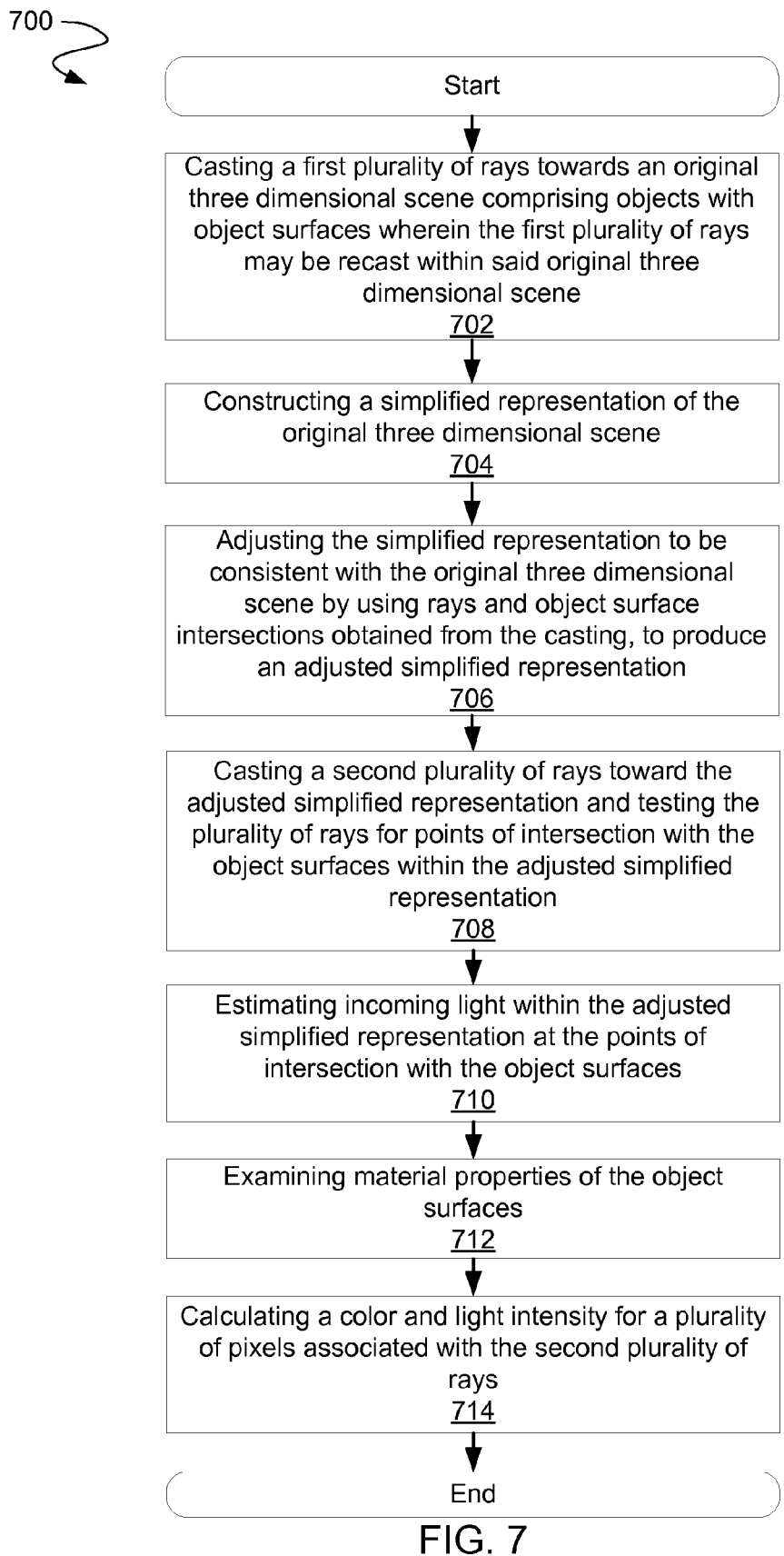
FIG. 7 depicts a flowchart of an exemplary computer graphics method of rendering an image from a simplified model of an original three dimensional scene, in accordance with one embodiment of the present invention.

FIG. 7 depicts a flowchart 700 of a computer-controlled exemplary method of rendering an image from a simplified model of an original three dimensional scene, in accordance with one embodiment of the present invention. The computer-controlled method of flowchart 700 may be implemented on the system of FIG. 1. In a block 702, a first plurality of rays are cast towards an original three dimensional scene comprising objects with object surfaces.

For example, in FIG. 2, a first plurality of rays are cast towards an original three dimensional scene. The original three dimensional scene comprises an object with a surface. The first plurality of rays intersect with the object at the object surfaces.

In a block 704 of FIG. 7, a simplified representation of the original three dimensional scene is constructed. The simplified representation may be constructed by using a k-nearest neighbor search to adapt to a local density of endpoints for the first plurality of rays. A radius is then derived for each of the first plurality of rays and a simplified representation of the original three dimensional scene is created in terms of splats on tangent planes of the first plurality of rays' endpoints.

For example, in FIG. 3, a simplified representation of the original three dimensional scene is created using splats on the tangent planes of the first plurality of rays' endpoints. The simplified representation is an approximation of the original three dimensional scene.

In a block 706 of FIG. 7, the simplified representation is adjusted to be consistent with the original three dimensional scene by using known rays and object surface intersections obtained from the casting. The result is an adjusted simplified representation. The adjusted simplified representation is made consistent with the original three dimensional scene by adjusting the simplified representation so that casting the first plurality of rays towards the simplified representation and casting the first plurality of rays towards the original three dimensional scene yield the same points of intersection with the object surfaces.

The adjusted simplified representation is created by tracing the first plurality of rays against the simplified representation and shrinking the plurality of splats that intersect with the first plurality of rays. For example, in FIG. 5, the simplified representation is adjusted to produce an adjusted simplified representation by shrinking the plurality of splats up to the intersection points of the first plurality of rays and plurality of splats.

After creating the simplified representation and adjusting it to produce the adjusted simplified representation, the adjusted simplified representation can be used for high-quality image rendering. In a block 708, a second plurality of rays are cast toward the adjusted simplified representation and tested for points of intersection with the object surfaces within the adjusted simplified representation. In a block 710, the incoming light is estimated within the adjusted simplified representation at the points of intersection with the object surfaces. In a block 712, the material properties of the object surfaces are examined. In a block 714, a color and light intensity for the plurality of pixels are associated with the second plurality of rays. Optionally, the result of block 714 may be displayed on a display screen.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage, or attribute that is not expressly recited in a claim should limit the scope of such claim 1n any way. Accordingly, the specification and drawings are to be regarded in an illustrative rather than a restrictive sense.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A computer graphics implemented method comprising:
casting a first plurality of rays towards an original three dimensional scene comprising objects with object surfaces wherein said first plurality of rays may be recast within said original three dimensional scene;

constructing a simplified representation of said original three dimensional scene, wherein said constructing further comprises:

using a k-nearest neighbor search to adapt to a local density of endpoints for said first plurality of rays;

deriving a radius for each of said first plurality of rays; and creating an approximation of said original three dimensional scene in terms of a plurality of splats on tangent planes of said endpoints; and adjusting said simplified representation to be consistent with said original three dimensional scene by using known rays and object surface intersections obtained from said casting, to produce an adjusted simplified representation, wherein said adjusting further comprises:

tracing said first plurality of rays against said simplified representation; and shrinking said plurality of splats that intersect with said first plurality of rays to produce said adjusted simplified representation.

2. The method of claim 1 further comprising:

casting a second plurality of rays toward said adjusted simplified representation and testing said second plurality of rays for points of intersection with said object surfaces within said adjusted simplified representation;

estimating incoming light within said adjusted simplified representation at said points of intersection with said object surfaces;

examining material properties of said object surfaces; and calculating a color and light intensity for a plurality of pixels associated with said second plurality of rays.

3. The method of claim 1 wherein said adjusted simplified representation is made consistent with said original three dimensional scene by adjusting said simplified representation so that casting said first plurality of rays towards said simplified representation and casting said first plurality of rays towards said original three dimensional scene yield the same points of intersection with said object surfaces.

4. The method of claim 1 wherein said adjusted simplified representation is used for high quality image rendering in a computer graphics system.

5. The method of claim 4 wherein a result of said rendering using said adjusted simplified representation of said three dimensional scene is substantially similar to a result of rendering by using said original three dimensional scene.

6. A non-transitory computer readable storage medium having stored thereon, computer executable instructions that, if executed by a computer system cause the computer system to perform a method of ray tracing, said method comprising:

casting a first plurality of rays towards an original three dimensional scene comprising objects with object surfaces wherein said first plurality of rays may be recast within said original three dimensional scene;

constructing a simplified representation of said original three dimensional scene, wherein said constructing further comprises:

using a k-nearest neighbor search to adapt to a local density of endpoints for said first plurality of rays;

deriving a radius for each of said first plurality of rays; and creating an approximation of said original three dimensional scene in terms of a plurality of splats on tangent planes of said endpoints; and adjusting said simplified representation to be consistent with said original three dimensional scene by using known rays and object surface intersections obtained from said casting, to produce an adjusted simplified representation, wherein said adjusting further comprises:

tracing said first plurality of rays against said simplified representation; and shrinking said plurality of splats that intersect with said first plurality of rays to produce said adjusted simplified representation.

7. The computer readable storage medium of claim 6, wherein said method further comprises:

casting a second plurality of rays toward said adjusted simplified representation and testing said second plurality of rays for points of intersection with said object surfaces within said adjusted simplified representation;

estimating incoming light within said adjusted simplified representation at said points of intersection with said object surfaces;

examining material properties of said object surfaces; and calculating a color and light intensity for a plurality of pixels associated with said second plurality of rays.

8. The computer readable storage medium of claim 6 wherein said adjusted simplified representation is made consistent with said original three dimensional scene by adjusting said simplified representation so that casting said first plurality of rays towards said simplified representation and casting said first plurality of rays towards said original three dimensional scene yield the same points of intersection with said object surfaces.

9. The computer readable storage medium of claim 6 wherein said adjusted simplified representation is used for high quality image rendering in a computer graphics system.

10. The computer readable storage medium of claim 9 wherein a result of said rendering using said adjusted simplified representation of said three dimensional scene is substantially similar to a result of rendering by using said original three dimensional scene.

11. A computer graphics system comprising:

a processor coupled to a computer readable storage media via a bus and wherein said processor is operable to execute computer readable code which causes the computer system to perform a method of rendering image data, said method comprising:

casting a first plurality of rays towards an original three dimensional scene comprising objects with object surfaces wherein said first plurality of rays may be recast within said original three dimensional scene;

constructing a simplified representation of said original three dimensional scene, wherein said constructing further comprises:

using a k-nearest neighbor search to adapt to a local density of endpoints for said first plurality of rays;

deriving a radius for each of said first plurality of rays; and creating an approximation of said original three dimensional scene in terms of a plurality of splats on tangent planes of said endpoints; and adjusting said simplified representation to be consistent with said original three dimensional scene by using known rays and object surface intersections obtained from said casting, to produce an adjusted simplified representation, wherein said adjusting further comprises:

tracing said first plurality of rays against said simplified representation; and shrinking said plurality of splats that intersect with said first plurality of rays to produce said adjusted simplified representation.

12. The system of claim 11, wherein said method further comprises:

casting a second plurality of rays toward said adjusted simplified representation and testing said second plurality of rays for points of intersection with said object surfaces within said adjusted simplified representation;

estimating incoming light within said adjusted simplified representation at said points of intersection with said object surfaces;

examining material properties of said object surfaces; and calculating a color and light intensity for a plurality of pixels associated with said second plurality of rays.

13. The system of claim 11 wherein said adjusted simplified representation is made consistent with said original three dimensional scene by adjusting said simplified representation so that casting said first plurality of rays towards said simplified representation and casting said first plurality of rays towards said original three dimensional scene yield the same points of intersection with said object surfaces.

14. The system of claim 11 wherein said adjusted simplified representation is used for high quality image rendering in a computer graphics system, and wherein a result of said rendering using said adjusted simplified representation of said three dimensional scene is substantially similar to a result of rendering by using said original three dimensional scene.

* * * * *